United States Patent
Seidler et al.

(10) Patent No.: US 6,625,392 B2
(45) Date of Patent: Sep. 23, 2003

(54) HEATING DEVICE FOR FILTER ELEMENTS OF A PARTICLE FILTER AND PARTICLE FILTER

(75) Inventors: Christian Seidler, Bretten (DE); Achim Bierbaum, Mickhausen (DE); Lutz Ose, Sternenfels (DE)

(73) Assignee: E.G.O. Elektro-Geraetebau GmbH (DE)

( * ) Notice: Subject to any disclaimer, the term of this patent is extended or adjusted under 35 U.S.C. 154(b) by 0 days.

(21) Appl. No.: 10/146,744

(22) Filed: May 16, 2002

(65) Prior Publication Data

US 2002/0176705 A1 Nov. 28, 2002

(30) Foreign Application Priority Data

May 22, 2001 (DE) .......................................... 101 27 223

(51) Int. Cl.[7] ................................................. F24M 3/00
(52) U.S. Cl. ....................................... 392/485; 219/201
(58) Field of Search ................................ 219/201, 400, 219/464; 392/485; 55/385.1, 267, 282; 165/80.1; 60/274; 95/15; 422/174; 76/146

(56) References Cited

U.S. PATENT DOCUMENTS

| | | | | |
|---|---|---|---|---|
| 4,447,711 A | * | 5/1984 | Fischer | 219/464 |
| 4,585,923 A | * | 4/1986 | Binder | 219/400 |
| 5,045,097 A | * | 9/1991 | Langen | 55/282 |
| 5,141,714 A | * | 8/1992 | Obuchi et al. | 422/174 |
| 5,409,669 A | * | 4/1995 | Smith et al. | 422/174 |
| 5,423,904 A | * | 6/1995 | Dasgupta | 96/146 |
| 5,551,971 A | * | 9/1996 | Chadderton et al. | 95/15 |
| 5,571,298 A | * | 11/1996 | Buck | 55/267 |
| 5,595,241 A | * | 1/1997 | Jelinek | 165/80.1 |
| 5,729,653 A | * | 3/1998 | Magliochetti et al. | 392/485 |
| 5,966,928 A | * | 10/1999 | Igarashi | 60/274 |
| 6,152,978 A | * | 11/2000 | Lundquist | 55/385.1 |
| 6,289,177 B1 | * | 9/2001 | Finger et al. | 392/485 |

* cited by examiner

Primary Examiner—Teresa Walberg
Assistant Examiner—Leonid Fastovsky
(74) Attorney, Agent, or Firm—Akerman Senterfitt

(57) ABSTRACT

A heating device for filter elements of a soot filter, as well as a soot filter are described. The filter elements are disk-shaped and stacked on one another in said soot filter. The heating device has a tubular heater with an outer tube and a heating conductor located therein. The essence of heating device is a very small diameter of the tubular heater compared with conventional tubular heaters. It is also constructed in such a way that its path covers a certain area. This can e.g. be a quadrant or semi-circle in a round filter element. The arrangement of the tubular heater in the soot filter is such that it passes close to the filter surface of the filter elements.

24 Claims, 3 Drawing Sheets

HEATING DEVICE FOR FILTER ELEMENTS OF A PARTICLE FILTER AND PARTICLE FILTER

FIELD OF APPLICATION AND PRIOR ART

The invention relates to a heating device for filter elements of a particle filter according to the preamble of claim 1 and to a particle filter according to the preamble of claim 20.

Heating devices are known, in which the filter is a carbon black or soot filter and comprises a stack of filter disks. Several circumferentially distributed tubular heaters of a conventional nature pass in externally engaging manner axially with respect to the disk stack. They heat the filter disk or the soot deposited thereon up to the ignition temperature thereof, so that the soot can burn and the filter is recleaned. This arrangement suffers from the major disadvantage that the necessary heating capacity is very high for obtaining a satisfactory burning off of the soot.

PROBLEM AND SOLUTION

The problem of the invention is to provide a heating device of the aforementioned type and a particle filter provided therewith enabling the burning of the deposited particles, e.g. soot, in an advantageous, efficient manner and as completely as possible.

This problem is solved by a heating device having the features of claim 1 and a particle filter having the features of claim 20. Further advantageous and preferred developments of the invention appear in the further claims and are described in greater detail hereinafter. By express reference the wording of the claims forms part of the content of the description. In this application the word comprise does not have the meaning of is limited to, but including.

According to the invention a heating device has a tubular heater, which has an outer tube and at least one heating conductor located therein. Such a tubular heater can fundamentally be constructed in similar manner to known tubular heaters, which are used in many fields of technology, e.g. in domestic ovens and the like. A preferred field of application for a heating device according to the invention is soot filters with disk-like, stacked filter elements. The invention can also be used for other filter types, e.g. advantageously also for ceramic filters. These ceramic filters can have a monolithic ceramic honeycomb body. According to the invention the tubular heater has a small diameter, particularly compared with conventional tubular heaters and as a result it can pass in the vicinity of the filter area or the surface of a filter element.

In a previously described filter disk stack or the like, it is possible as a result of the small diameter to place the tubular heater between the filter disks or very close to the filter surface. The path of the tubular heater is chosen in such a way that through a corresponding construction or bending the tubular heater covers a surface area. The surface-covering path of the tubular heater can e.g. be in meander-like form. Further possibilities are provided by curved paths. Through the combination of the limited distance from the filter area and the flat path, a burning off of deposited soot or other particles from filter disks or elements is very advantageously possible and can be achieved with a limited energy expenditure.

A small diameter is understood to mean a diameter of less than 3 mm. Conventional tubular heaters have a diameter of 6.5 mm or more. With particular advantage the tubular heater is thinner than 2 mm. According to a preferred embodiment the diameter is only approximately 1.5 mm. Thus, the spacing between two filter elements between which such a tubular heater is placed, is a few millimetres, e.g. 2 to 4 mm. This permits a confined arrangement or stacking of several filter elements with interposed heating means.

A tubular heater can be constructed in such a way that it only covers part of an area or surface of a soot filter element. This fraction of the surface area is preferably a quarter or a half. A specific design possibility is a tubular heater or a heating device in the form of a semicircle or quadrant. This means that the tubular heater is constructed in such a way that it covers or heats such a surface area without precisely corresponding to the outer contours thereof. This is particularly advantageous with round or circular filter elements.

The material for the heating conductor can be a chromium-containing material, e.g. a chromium, nickel or similar, conventionally used alloy. Particular preference is given to FeCrAl. The outer tube is also advantageously made from the latter.

The heating conductor diameter can be advantageously adapted to the dimensions of the tubular heater and the electrical requirements. An advantageous diameter is between 0.2 and 1 mm, more particularly approximately 0.5 mm. The heating conductor is preferably substantially straight or uncoiled. It preferably passes linearly in the tubular heater.

It is particularly advantageous if the tubular heater has a limited or low mass. This can be achieved on the one hand by a thin outer tube and also with respect to the wall thickness and the overall diameter. A further possibility is a correspondingly low-mass insulating material between the heating conductor and the outer tube. It is particularly advantageous to give the tubular heater a low mass, because a lower mass gives rise to a faster glowing or heating time. For this purpose it is possible to use for the heating device or tubular heater materials aiding a low thermal inertia, i.e. a low thermal capacity. In addition, this leads to a weight saving. As a result of a small diameter the volume is small, so that there is a reduced encroachment on the filter volume or filter capacity.

The further advantage of a low-mass tubular heater is that on engaging or striking against the surface of a filter element it gives rise to no serious damage, because the kinetic energy of such a blow is smaller with a lower mass. A light tubular body is also less susceptible to vibrations, such as can arise when using soot filters in motor vehicles or the like.

An insulation between the heating conductor and the outer tube can have a very fine-grain powder. Advantageously this is of a finer grain nature than in conventional tubular heaters. It can also be compacted in order to ensure a reliable insulation, particularly with curved tubular heaters. An advantageous material is magnesium oxide.

In order to electrically connect the tubular heater or heating conductor, it can be connected or welded to a connecting lug. This advantageously takes place in the area where the heating conductor passes out of the outer tube. Such a connecting lug can have a widely varying design in order to create a simple and reliable connection possibility. For improving the connection there is an additional tubular sleeve or a short tube over the connection of the heating conductor to the connecting lug. Thus, the connection is both fixed and protected against external mechanical influences. Within this tubular sleeve or an envelope of the connection can be introduced an embedding pourable compound for insulation purposes. Ceramic materials are suitable and they either dry out in a conventional manner or are not burned. Another possibility is glass or a glass duct. Another advantage of such an additional sleeve or the like is that over the larger mass and surface a cooling of the heating device or tubular heater can take place in this area. This is e.g. advantageous in those cases where the connection is not located in the cooling gas flow within a filter.

The outer tube can be used as an electric return conductor. For this purpose e.g. the heating conductor can be welded at one end to the outer tube, which reduces the connection costs and fault susceptibility.

A method for the manufacture of such a tubular heater can be essentially based on known methods for the production of known tubular heaters.

A particle filter according to the invention has several filter elements stacked in a union. The filter elements have filter surfaces where, on passing through the same, particles or soot are separated from a gas. With at least one filter area is associated a heating device, in the manner described hereinbefore and is used for burning off particles deposited on the filter surface and consequently cleans the filter element or face. According to the invention the heating device in the form of a tubular heater does not pass outside on the edge of a filter surface, but instead partly covers the same or runs very close thereto. This makes it possible to produce the energy supply much more directly to the filter surface and consequently e.g. to improve soot burning. This is made possible by the above-described, very thin tubular heaters according to the invention. In conventional tubular heaters for fitting between the filter elements the spacing thereof must be sufficiently large that the overall size of the filter for a given filter performance would be excessive. For further reducing the diameter or size the tubular heater can be pressed flat and e.g. have an oval cross-section.

A tubular heater can be constructed in such a way that it does not cover the entire surface of a filter element. In the case of a predetermined supply voltage of 12 V, e.g. in a motor vehicle, this could lead to high current intensities. Therefore a tubular heater advantageously only covers part of a filter element, e.g. a quarter or preferably half.

The filter elements in the above-described particle filter are advantageously disk-like and can in particular be constructed as double disks with an inner space. These filter elements are stacked on one another and a gap is advantageously provided between the filter surfaces. In said gap or between in each case two facing filter faces is located a heating device with a tubular heater according to the invention. This tubular heater heats both filter surfaces, preferably in a uniform manner.

A tubular heater can be used as a spacer for a filter. This is appropriate e.g. in the case of a filter formed from several filter elements, also for improving the stability thereof. Such a use is particularly preferred with a stack filter having several filter elements. With a corresponding construction, the tubular heater can also be used for fixing filter elements.

These and further features can be gathered from the claims, the description and the drawings and the individual features, either individually or in the form of subcombinations, can be used in an embodiment of the invention and in other fields and can represent advantageous, independently protectable constructions for which protection is claimed here. The subdivision of the application into individual sections and the subheadings in no way restrict the general validity of the statements made thereunder.

BRIEF DESCRIPTION OF THE DRAWINGS

Embodiments of the invention are shown in the drawings and are explained hereinafter. In the drawings show.

DETAILED DESCRIPTION OF THE EMBODIMENTS

Figure 1:
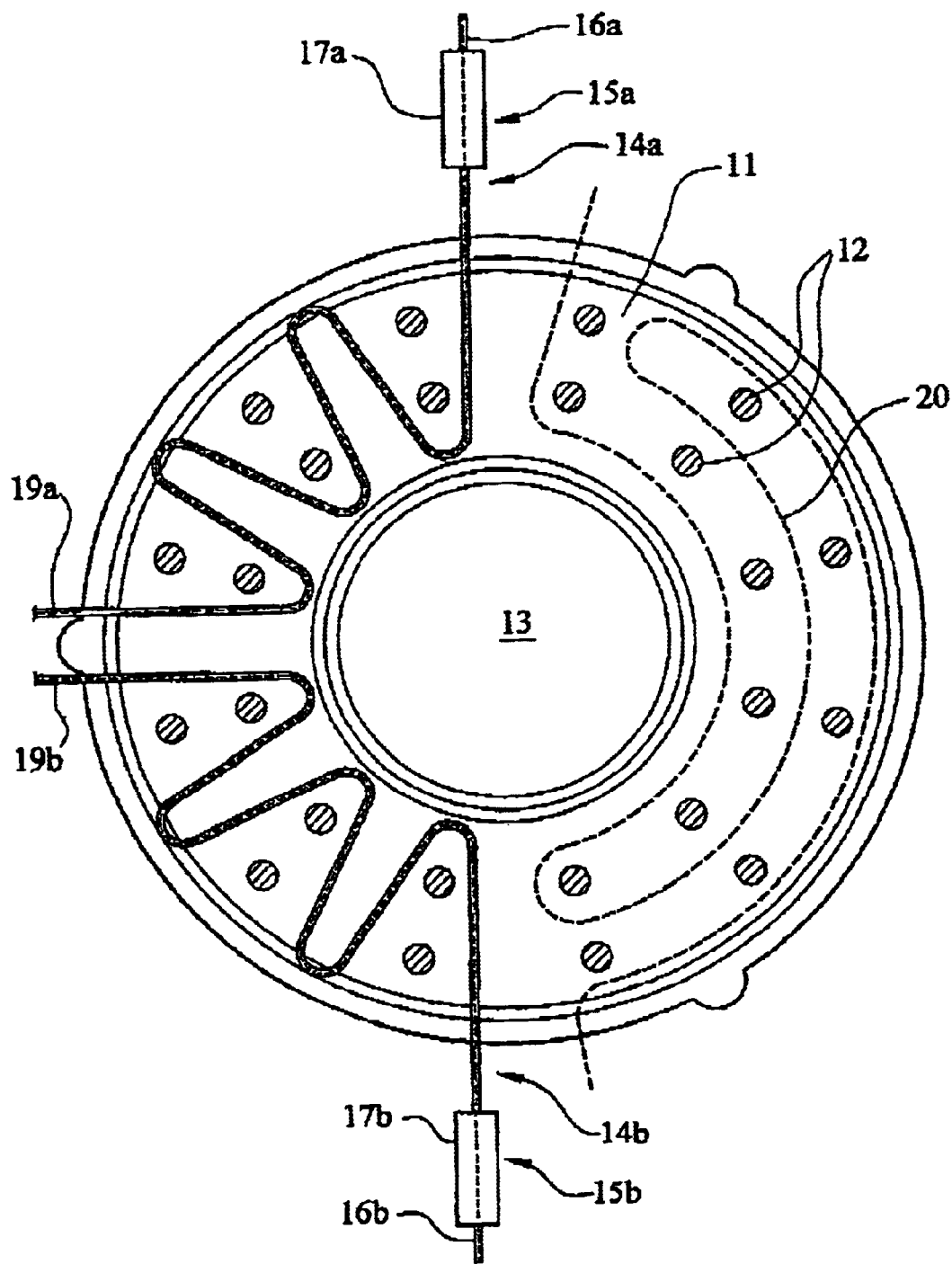
FIG. 1 A plan view of a filter disk with two tubular heaters according to the invention passing over the surface thereof.

FIG. 1 shows a filter disk 11 having indentations and bulges 12. Such a filter disk with a central outlet air duct 13 is e.g. disclosed in DE 101 06 769, whose content is hereby made by express reference into part of that of the present description. Just above the surface of the filter disk 11 passes a tubular heater 14a and 14b, as will become clear hereinafter from FIG. 2. As is apparent, the tubular heaters 14a and 14b pass in meander-like manner in the vicinity of the surface of the filter disk 11 and around the indentations and bulges 12.

On in each case one free end passing out of the region of the filter disk 11, each tubular heater 14a and 14b has a connection 15a, 15b. The latter in each case comprises a connecting lug 16a, 16b, which is connected to a heating conductor in the outer tube of the tubular heater 14. A preferred connection method is welding. It is also possible to have mechanical connections in the form of crimp joints and the like. A tubular sleeve 17a, 17b is placed over the connection between the connecting lug 16 and the heating conductor. The interior of the tubular sleeve 17 is filled with an insulating, pourable compound. This additionally mechanically secures the electrically conductive connection between the connecting lug 16 and the heating conductor. This connection is shown on a larger scale in FIG. 3. It is particularly advantageous when using a filter according to the invention in mechanically stressed applications, e.g. in a car. Through the additional enveloping or mechanical fastening it is possible to absorb vibrations. A high-mass or reinforced and enlarged connecting area provides for a better thermal cooling of the connection.

The two other free ends 19a and 19b of the tubular heaters 14a and 14b are shown without connections or the like. This is intended to provide the viewer of FIG. 1 with two possibilities. On the one hand the free ends 19a, 19b can issue into further connections, similar to connections 15a, 15b. These connections can then be used for the electrical contacting of the tubular heater 14. In this case there are two tubular heaters 14, which in each case cover a quarter of the surface of the filter disk 11.

Alternatively the free ends 19a, 19b can be interconnected and this takes place substantially in accordance with the remaining meanders of the tubular heater in the vicinity of the filter disk 11. This would give rise to a tubular heater covering half the surface of the filter disk 11.

The path of the tubular heater 14 shown in FIG. 1 is only of an exemplified nature. Another possibility would be a partly concentric path of a tubular heater, as indicated by the broken lines 20. Admittedly the broken lines 20 are in the form of a semicircle covering the filter disk 11, but it is conceivable, in accordance with the tubular heaters 14, for them to in each case cover quadrants or also larger pitch circles.

Figure 2:
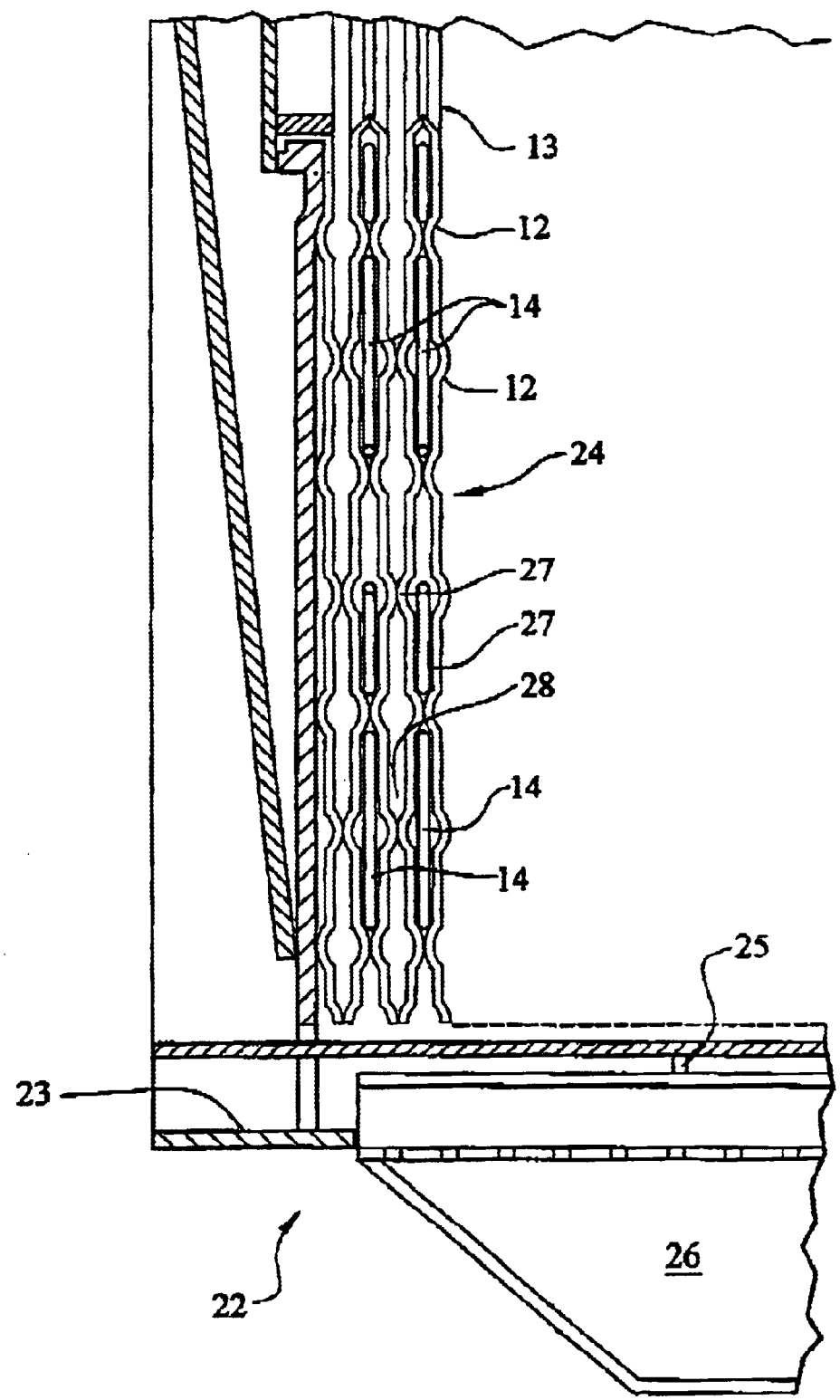
FIG. 2 A section through a filter according to the invention with stacked filter disks and interposed tubular heaters.

FIG. 2 is a cross-section through a soot filter 22 according to the invention. The filter has a filter housing 23. The stacked structure of the filter disks 24 is readily apparent. The filter disks 24 comprise in each case two filter walls 27, which together form a double-walled filter disk. The filter disks 24 are located in a circumferential filter area 25 and in the vicinity of the central outlet air duct 13 are interconnected and fixed in the soot filter 22. The filter area 25 is connected in gas-permeable manner with an inner area 28 in the filter disks 24 via the path through the filter walls 27.

Tubular heaters 14 according to FIG. 1 pass between two filter disks 24. According to FIG. 2 one tubular heater 14 is provided for each gap between two filter disks 24. It can be seen that the tubular heaters 14 pass equidistantly from the filter walls 17 and in the centre thereof. This allows a uniform heating of the filter walls and a uniform burning off of soot. The electrical connections of the tubular heaters 14 are not shown so as not to overburden the representation. However, they can be essentially in accordance with FIG. 1.

It is also clear how the tubular heaters 14 could easily be used as spacers for the filter disks 24. This makes it possible to reduce the filter disk spacing. Alternatively bulges or projections could be provided on the filter elements and a tubular heater would pass thereon. Finally, a tubular heater can in FIG. 2 have a slight corrugated configuration in order to maintain the spacing.

It is obviously possible and advantageous to provide a corresponding heating with a tubular heater for the filter wall 27 to the far left in FIG. 2. However, this has been omitted so as not to overburden the drawing and is obvious to the expert. It is also pointed out that FIG. 2 is of an exemplified and diagrammatic nature. It is merely intended to show how a soot filter can be constructed with a flat disk stack and how according to an exemplified possibility tubular heaters can pass between the same.

Below the soot filter 22 or open upwards to the filter area 25 is fitted an ash collector for collecting the ash of the soot burnt on the filter walls 27.

Preferably the electrical connections for the tubular heaters 14 are located outside the filter housing 23 and are consequently not exposed to the corrosive waste gas atmosphere. This also ensures that no valuable space is wasted for said connections in the filter.

Figure 3:
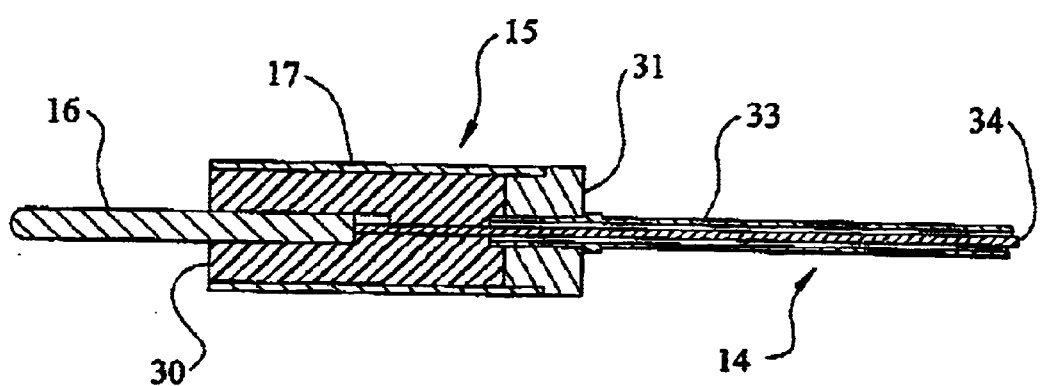
FIG. 3 A section through a connection of the tubular heater of FIG. 1.

FIG. 3 shows the detailed construction of the connection 15. The outer tube 33 and heating conductor 34 issue into a flange nipple 31, which is made from insulating material, preferably plastic or ceramic. The heating conductor 34 extends further than the outer tube 33 and engages on a step of the connecting lug 16, where it is fixed, e.g. by welding or by a mechanical connection. By means of a matching shoulder, the tubular sleeve 17 is engaged on the flange nipple 31. It can be clamped or additionally secured. The tubular sleeve is filled with an insulating, pourable compound 30. Once again an appropriate material is used, e.g. a ceramic or similar insulating, pourable compounds.

The fine-grain insulating material is located between the outer tube 33 and heating conductor 34, but is not shown so as not to overburden representation. The pourable compound 30 serves to prevent an escape of the insulating material and for securing the fastening of the tubular sleeve 17, flange nipple 31, outer tube 33 and heating conductor 34. The tubular sleeve 17 can be made from metal, because it is insulated by the pourable compound 30 against the heating conductor 34.

Function

A tubular heater according to the invention can be individually electrically operated. It is also possible to operate several of the tubular heaters in a particle filter in intervals and in part also in interconnected form. Operation should be such that particles or soot can be adequately frequently burnt off the filter surfaces of filter elements. However, the total necessary current intensity when used in motor vehicles should remain under a given value as a result of the maximum current load of the vehicle power supply. A control method can advantageously be defined on the basis of these criteria. The aforementioned DE 101 06 769 describes a possibility for controlling such heating means and said method can also be used with advantage here. By express reference it is made into part of the content of the present application.

The fixing or fitting of tubular heaters to a filter or between several filter elements of a filter can take place in simple manner through the insertion of the tubular heaters. It is also possible to have a mechanical holding or fixing of the tubular heaters through the necessary electrical contacting thereof. No problem arises if the tubular heater wholly or partly engages on the filter element. It is also possible to bring about a fixing of the heating body by alternate engagement between two filter areas. As a result of the low mass of the tubular heater the filter surface is not damaged in the case of impacts or vibrations.

As a result of the electrical insulation between the heating conductor of the tubular heater and the outer tube, no additional insulation is required as a result of the insulating material contained therein. The outer tube is preferably made from FeCrAl, which forms alumina on the surface. The latter is both insulating and protects the tubular heater against a corrosive atmosphere, such as prevails in a soot or other filter.

If a tubular heater according to the invention is used in a soot filter for a motor vehicle, the supply voltage is typically 12 V. As a result of this low voltage it is possible to have a limited insulating spacing between the heating conductor and outer tube. This permits a very thin construction of the tubular heater, which brings about a very major advantage of the present invention.

According to an embodiment of the invention a heating device for filter elements of a carbon black or soot filter, as well as a carbon black or soot filter can be created. In said soot filter the filter elements are disk-like and stacked on one another. The heating device has a tubular heater with an outer tube and a heating conductor located therein. The essence of the invention is a very small tubular heater diameter compared with conventional tubular heaters. It is also constructed in such a way that its path covers a certain surface area. The arrangement of the tubular heater in the soot filter is such that it is close to the filter surface of the filter elements.

What is claimed is:

1. Heating device for filter elements of a particle filter, said heating device comprising at least one tubular heater with an outer tube and at least one heating conductor in said outer tube, wherein said tubular heater has a small diameter and is constructed in such a way that it is associated with one of said filter elements, said filter element comprising a filter area, said tubular heater being arranged close to said filter area, said tubular heater in its path covering an area.

2. Heating device according to claim 1, wherein said filter elements are disk-shaped and stacked.

3. Heating device according to claim 1, wherein said tubular heater has a diameter of less than 2 mm.

4. Heating device according to claim 1, wherein said path of said tubular heater is meander-like and consequently covers an area, said area being larger than said path itself.

5. Heating device according to claim 4, wherein said tubular heater is constructed in such a way that it covers at least a quarter of the surface of one if said particle filter elements.

6. Heating device according to claim 5, wherein said particle filter element is circular and said tubular heater covers at least a quadrant of the surface of said filter element.

7. Heating device according to claim 1, wherein the material of said heating conductor contains chromium.

8. Heating device according to claim 7, wherein the material of said heating conductor is FeCrAl.

9. Heating device according to claim 1, wherein said heating conductor diameter is between 0.2 and 1 mm.

10. Heating device according to claim 1, wherein said heating conductor is uncoiled.

11. Heating device according to claim 10, wherein said heating conductor passes in linear manner in said outer tube of said tubular heater.

12. Heating device according to claim 1, wherein said tubular heater is of a low mass nature.

13. Heating device according to claim 12, wherein said tubular heater has a thin, low-mass outer tube.

14. Heating device according to claim 1, wherein an insulation between said heating conductor and said outer tube comprises a very fine-grain powder.

15. Heating device according to claim 14, wherein said insulation powder is compacted.

16. Heating device according to claim 1, wherein said heating conductor passes out of said outer tube and comprises a connection, said connection being constituted by a connecting lug, said connecting lug being connected to said heating conductor.

17. Heating device according to claim 16, wherein said connecting lug is welded to said heating conductor.

18. Heating device according to claim 16, wherein an additional tubular sleeve is placed over said connection between said heating conductor and said connecting lug.

19. Heating device according to claim 18, wherein said tubular sleeve has an embedding of insulating, pourable compound.

20. Particle filter with several filter elements, said filter elements being arranged in stack-like manner in a union, said filter elements comprising filter surfaces and with at least one filter surface is associated a heating device according to claim 1 for burning off deposited particles of said filter surfaces, wherein said heating device is arranged very close to said filter surface.

21. Particle filter according to claim 20, wherein said tubular heater covers part of said surface of one of said filter elements, preferably quarter or half thereof.

22. Particle filter according to claim 21, wherein said tubular heater covers at least a quarter of said surface of one of said filter elements.

23. Particle filter according to claim 20, wherein said filter elements are disk-shaped.

24. Particle filter according to claim 23, wherein said filter elements are constructed as double disks with an inner area, said filter elements being stacked on one another and with in each case two facing filter areas is associated a common, interposed one of said heating devices.

* * * * *